DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 3, 1974

929 O.G. 10

T929,006
BAKING METHOD

Louis J. Lee, Rt. 13, 304 Montezuma Road.,
Kingsport, Tenn. 37664

Filed Feb. 19, 1974, Ser. No. 443,668
Int. Cl. A21d *2/16*
U.S. Cl. 426—24
No Drawing. 8 Pages Specification

A method for producing bread and other fermented dough products without the use of appreciable quantities of fats is disclosed. Succinylated monoglycerides, polysorbate 60, ethoxylated monoglycerides, sodium stearyl lactylate or calcium stearyl lactylate, alone or in combination, are incorporated into the baking mix prior to baking in amounts up to about 0.5 percent by weight of the flour. The process may be used in the continuous, brew-dough, sponge dough, or straight dough process and produces results similar to shortening and emulsifier in terms of volume, softness and texture.